(12) United States Patent
Choi et al.

(10) Patent No.: US 8,320,892 B2
(45) Date of Patent: Nov. 27, 2012

(54) METHOD AND SYSTEM FOR PROVIDING LINKAGE SERVICE OF ADDRESS BOOK DATA BETWEEN TELEMATICS AND MOBILE TERMINAL

(75) Inventors: Jong-Hyuk Choi, Seoul (KR); Byung-Koo Ahn, Seoul (KR)

(73) Assignee: KT Corporation, Gyeonggi-do (KR)

( * ) Notice: Subject to any disclaimer, the term of this patent is extended or adjusted under 35 U.S.C. 154(b) by 365 days.

(21) Appl. No.: 12/600,563

(22) PCT Filed: May 16, 2008

(86) PCT No.: PCT/KR2008/002749
§ 371 (c)(1),
(2), (4) Date: Nov. 17, 2009

(87) PCT Pub. No.: WO2008/143434
PCT Pub. Date: Nov. 27, 2008

(65) Prior Publication Data
US 2010/0210252 A1 Aug. 19, 2010

(30) Foreign Application Priority Data

May 17, 2007 (KR) ........................ 10-2007-0048219
Jun. 26, 2007 (KR) ........................ 10-2007-0063130

(51) Int. Cl.
*H04M 3/42* (2006.01)
*H04M 1/00* (2006.01)
*H04B 7/00* (2006.01)
(52) U.S. Cl. ...................... 455/415; 455/569.2; 455/41.2
(58) Field of Classification Search .................. 455/415, 455/417, 41.2, 569.1, 569.2
See application file for complete search history.

(56) References Cited

U.S. PATENT DOCUMENTS

| 7,443,972 | B1 * | 10/2008 | Barlow et al. ............ 379/212.01 |
| 2002/0046285 | A1 * | 4/2002 | Yasushi et al. ................ 709/228 |
| 2004/0205147 | A1 | 10/2004 | Fukuzato |
| 2005/0149564 | A1 | 7/2005 | Jain et al. |
| 2006/0149457 | A1 * | 7/2006 | Ross et al. ..................... 701/117 |
| 2006/0154659 | A1 * | 7/2006 | Roter et al. ................ 455/422.1 |
| 2006/0268899 | A1 | 11/2006 | Lim |
| 2007/0022177 | A1 * | 1/2007 | Kwon ........................... 709/217 |
| 2007/0093200 | A1 * | 4/2007 | Dobosz ........................ 455/3.02 |

FOREIGN PATENT DOCUMENTS

| JP | 2005-045324 A | 2/2005 |
| JP | 2005-124100 A | 5/2005 |
| JP | 2007-053559 A | 3/2007 |
| KR | 10-2004-0010935 A | 2/2004 |
| KR | 10-2004-0045805 A | 6/2004 |
| KR | 10-2005-0023139 A | 3/2005 |
| KR | 10-2005-0077438 A | 8/2005 |

* cited by examiner

*Primary Examiner* — Christopher M Brandt
(74) *Attorney, Agent, or Firm* — IP Legal Services, LLC

(57) ABSTRACT

The present invention relates to a method for providing a linkage service of address book data between telematics and a mobile terminal by interworking with a mobile communication network.

According to the present invention, an address book data link service providing method of a call transfer service providing system between telematics and a mobile terminal that interworks with a mobile communication network, comprises (a) receiving a call transfer service request information from a telematics device mounted in a vehicle and distinguishing a subscriber of the telematics device; (b) searching a service registration information of the subscriber and checking information about the telematics device and the mobile terminal of the subscriber; and (c) transferring an address book data of the mobile terminal of the subscriber to the telematics device.

15 Claims, 5 Drawing Sheets

METHOD AND SYSTEM FOR PROVIDING LINKAGE SERVICE OF ADDRESS BOOK DATA BETWEEN TELEMATICS AND MOBILE TERMINAL

TECHNICAL FIELD

The present invention relates to a call transfer service between telematics and a mobile terminal, and in particular, to method and system for providing an address book data link service in call transfer between telematics and a mobile terminal.

BACKGROUND ART

Telematics is an integrated term of telecommunications and informatics, and also means association between vehicles and mobile communications. And, telematics provides a vehicle with a timely location information-based security service, a productivity improvement service through offering of an office environment, or other personalized service including finance, reservation or product purchase, based on mobile communications and Internet technology. Typically, telematics provides a navigation function, a traffic report function, an emergent rescue function or a function related to various entertainment.

And, a telematics device that implements telematics has a CDMA module embedded therein, and thus provides mobile communication, and if the telematics device is connected to an external mobile phone of a user, provides mobile communication hands-free. And, the telematics device has functions of a mobile phone, and thus can store a personal information such as CDMA, Internet browser, voice memo or an address book, and may incorporate a mobile office or support an electronic mail service.

Recently, in consideration of compatibility between a telematics device and a mobile terminal, techniques for integrating a telematics service and a mobile terminal service have been developing. Among the techniques, a service using a call transfer technique between a telematics device and a mobile terminal is available. This service allows a user to use a mobile communication service at a desired device through a call transfer between the mobile terminal and the telematics device. That is, if a subscriber having a mobile terminal gets in a vehicle while using a mobile communication service, the service transfers a call to a telematics device mounted in the vehicle, so that the user can use a mobile communication service by the telematics device.

However, the above-mentioned method has a disadvantage that the user can not use an address book or an address directory stored in the mobile terminal at the telematics device mounted in the vehicle. That is, if a call is transferred from the mobile terminal to the telematics device, the user can use a mobile communication service by the telematics device, but can not use an address book stored in the mobile terminal at the telematics device. Therefore, when the user uses a mobile communication service through call transfer to the telematics device, the user can not use information such as an address book used at the mobile terminal before call transfer, and thus the user should separately search an address book of the mobile terminal or directly input a telephone number or an address into the telematics device, which causes a cumbersome task to the user.

DISCLOSURE

[Technical Problem]

The present invention is designed to solve the above-mentioned problems, and therefore it is an object of the present invention to provide an address book link service, which enables a telematics device to use an address book data stored in a mobile terminal in the case that a call is transferred from the mobile terminal to the telematics device.

And, these and other features, aspects, and advantages of the present invention will be more fully described in the preferred embodiments of the present invention. And, the objects and advantages of the present invention can be implemented by configurations recited in the claims singularly or in combination.

[Technical Solution]

In order to achieve the above-mentioned objects, according to the present invention, an address book data link service providing method of an address book data link service providing system for providing a call transfer service and an address book link service between telematics and a mobile terminal by interworking with a mobile communication network, comprises (a) receiving a call transfer service request information from a telematics device mounted in a vehicle and distinguishing a subscriber of the telematics device; (b) searching a service registration information of the subscriber and checking information about the telematics device and the mobile terminal of the subscriber; and (c) transferring an address book data of the mobile terminal of the subscriber to the telematics device.

According to another aspect of the present invention, an address book data link service providing system in a call transfer service between telematics and a mobile terminal that interworks with a mobile communication network, comprises a subscriber database for storing a service registration information including a subscriber information of a subscriber of a telematics device mounted in a vehicle, and a terminal information about the telematics device and the mobile terminal of the subscriber; an address book database for collecting address book data stored in mobile terminals of a plurality of subscribers, and classifying and storing the address book data according to mobile terminal; and a call transfer service module interworking with the subscriber database to receive a call transfer service request information from the telematics device, analyzing the call transfer service request information to distinguish a subscriber of the telematics device and check information about the telematics device and the mobile terminal of the subscriber, and requesting the mobile communication network to switch a service connection with the mobile communication network from the checked mobile terminal to the telematics device; and an address book link module for extracting an address book data of the mobile terminal checked in the call transfer service module from the address book database and transmitting the address book data to the telematics device.

According to another aspect of the present invention, a telematics device capable of sending and receiving a predetermined data with a mobile communication network, comprises a storing unit having a trigger field for storing a setting information of a trigger that switches a service connection with the mobile communication network from a mobile terminal, for which a subscriber of the telematics device subscribed, to the telematics device, and an address book field for storing an address book data of a subscriber who used the telematics device recently; a call transfer control unit for executing the trigger according to the setting information to transmit a service request information for requesting a switch of the service connection with the mobile terminal to a call transfer service providing system interworking with the mobile communication network, and switching the service connection of the mobile terminal according to response of the call transfer service providing system; and an address book control unit for providing a subscriber identification information and a subscriber certification information according to execution of the trigger, checking a subscriber by the subscriber identification information and the subscriber certification information, and updating and storing an address book data of the corresponding subscriber provided from an address book link server into the address book field of the storing unit.

According to another aspect of the present invention, an address book data link service providing method of an address book data link service providing system for providing a call transfer service and an address book link service between telematics and a mobile terminal by interworking with a mobile communication network, comprises (a) receiving a call transfer service request information from a telematics device mounted in a vehicle and distinguishing a subscriber of the telematics device; (b) searching a service registration information of the subscriber and checking information about the telematics device and the mobile terminal of the subscriber; and (c) requesting the mobile communication network to switch a service connection with the mobile communication network from the mobile terminal to the telematics device; and (d) the system authorizing the call-transferred telematics device to access an address book link server and an address book data stored in the mobile terminal of the subscriber.

BEST MODEL

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

Figure 1:
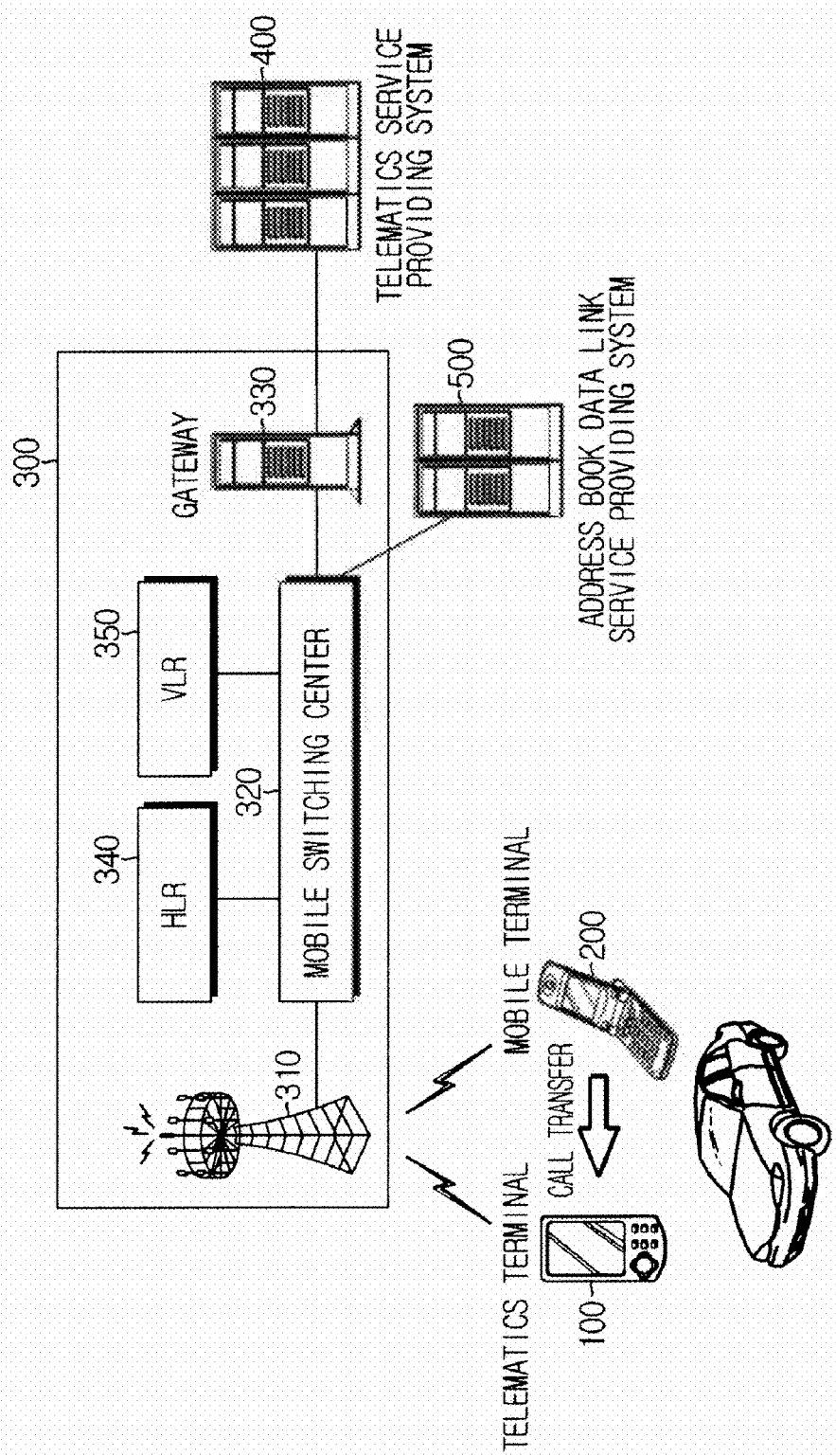
FIG. 1 is a view illustrating a configuration of a system for implementing an address book link service between telematics and a mobile terminal according to an embodiment of the present invention.

FIG. 1 is a view illustrating a system for implementing an address book link service between telematics and a mobile terminal according to an embodiment of the present invention.

Referring to FIG. 1, a configuration for providing an address book link service comprises a telematics device 100, a mobile terminal 200, a mobile communication network 300, a telematics service providing system 400, and an address book data link service providing system 500.

The telematics device 100 is mounted in a vehicle, and is connected with the mobile communication network 300 and the telematics service providing system 400 through the mobile communication network 300 to receive a telematics service. At this time, the telematics device 100 is capable of sending and receiving a predetermined data with the address book data link service providing system 500 interworking with the mobile communication network 300, and thus receives a call transfer service that provides a mobile communication service function in the same subscriber environment as the mobile terminal 200, and an address book link service. Here, in the case that the telematics device 100 and the mobile terminal 200 exist together, the call transfer service provides all mobile communication service functions of the mobile terminal 200 through the telematics device 100. And, in the case that a call is transferred from the mobile terminal 200 to the telematics device 100, the address book link service transfers an address book data and a telephone number data stored in the mobile terminal 200 to the call transferred telematics device 100, and updates and stores the address book data and the telephone number data into an address book field of the telematicts device 100.

The mobile terminal 200 is capable of voice communication with the opposite party through the mobile communication network 300 and data communication with the mobile communication network 300. The mobile terminal 200 may include PDA (Personal Digital Assistant), a cellular phone, a PCS (Personal Communication Service) phone, a GSM (Global System for Mobile) phone, a WCDMA (Wideband CDMA) phone, a CDMA-2000 phone or an MBMS (Multimedia Broadcast and Multicast Service) phone.

The mobile communication network 300 is connected with the telematics device 100 and the mobile terminal 200 to form a mobile communication network for providing a telematics service and a mobile communication service. Specifically, the mobile communication network 300 includes a radio transceiver station 310, a mobile switching center 320, a home location register (HLR) 340, and a visitor location register (VLR) 350. Here, the radio transceiver station 310 transmits to the mobile switching center 320 location information of the telematics device 100 and the mobile terminal 200, a registrant information, a communication request signal and a data request signal, and transmits the communication request signal and the data request signal from the mobile switching center 320 to the mobile terminal 200. The HLR 340 and VLR 350 perform a location registration function, store and manage a subscriber information, provide various mobile communication services and perform billing processing according to mobile communication service.

And, when the mobile switching center 320 receives a request for a telematics service from the telematics device 100, the mobile switching center 320 connects the telematics device 100 with the telematics service providing system 400 through a gateway 330, so that the telematics device 100 receives the telematics service. And, the mobile switching center 320 transmits data received from the telematics service providing system 400 to the telematics device 100. And, the mobile switching center 320 sets to the telematics device 100 a mobile communication service connection set to the mobile terminal 200 or release the mobile communication service connection by control of the address book data link service providing system 500.

The telematics service providing system 400 provides various telematics services to the telematics device 100.

The address book data link service providing system 500 interworks with the mobile communication network 300, and provides a call transfer service and an address book data link service to the telematics device 100 through the mobile communication network 300.

Hereinafter, the address book data link service providing system 500 is described in detail with reference to FIG. 2.

Figure 2:
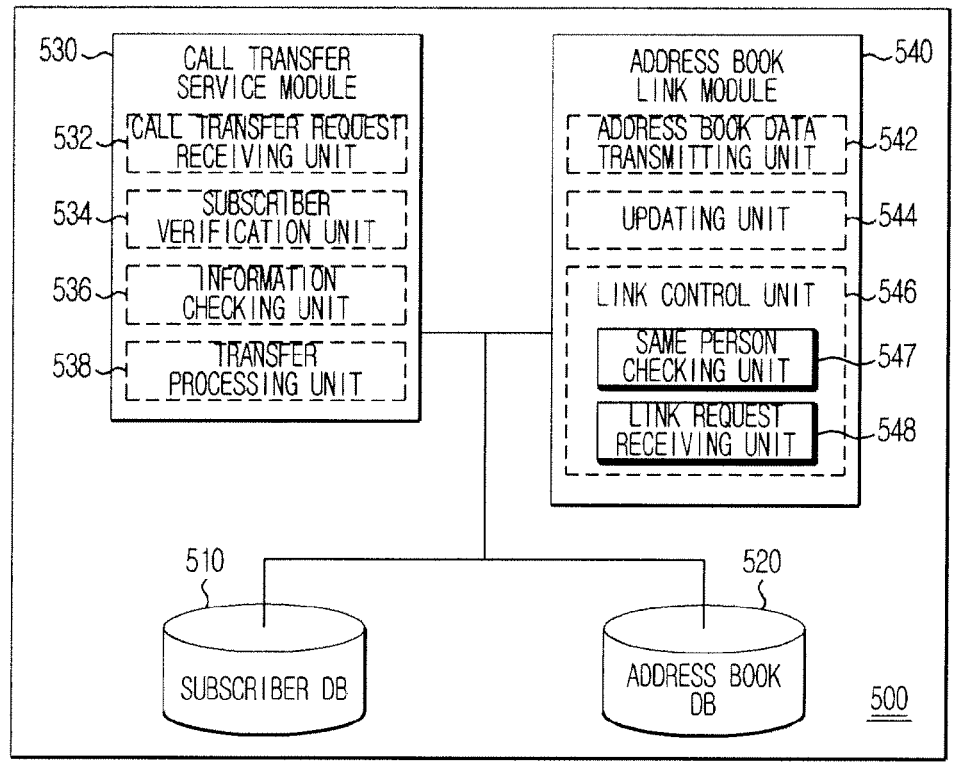
FIG. 2 is a view illustrating a configuration of an address book data link service providing system between telematics and a mobile terminal according to an embodiment of the present invention.

FIG. 2 is a view illustrating a configuration of an address book data link service providing system between telematics and a mobile terminal according to an embodiment of the present invention.

Referring to FIG. 2, the address book data link service providing system 500 according to the present invention includes a subscriber database 510, an address book database 520, a call transfer service module 530, and an address book link module 540.

The subscriber database 510 stores and manages a service registration information including a subscriber information of a subscriber of the telematics device 100 and a terminal information about the telematics device 100 and the mobile terminal 200 of the subscriber. Here, the service registration information is formed of a table containing a subscriber field representing the subscriber information, a telephone number field representing a telephone number of the mobile terminal 200 and a telephone number assigned to the telematics device 100, and a service information field representing allowance or rejection of a call transfer service and an address book link service.

The address book database 520 stores and manages address book data or telephone number data stored in mobile terminals of a plurality of subscribers. The address book data or telephone number data is received periodically from the mobile terminals to update the address book database 520, and stored and managed in the address book database 520.

The call transfer service module 530 interworks with the subscriber database 510, and is configured to distinguish a subscriber at the request of the telematics device 100 and perform call transfer processing to transfer a call from the mobile terminal 200 of a corresponding subscriber to the telematics device 100. The call transfer service module 530 includes a call transfer request receiving unit 532, a subscriber distinguishing unit 534, an information checking unit 536 and a transfer processing unit 538.

The call transfer request receiving unit 532 is configured to receive a call transfer service request information from the telematics device 100. At this time, the call transfer service request information may contain a subscriber identification information and a subscriber certification information. That is, the call transfer request receiving unit 532 receives a subscriber identification information, such as ID, for identifying a subscriber who subscribed for a call transfer service, and receives a subscriber certification information, such as password, for certifying a subscriber according to a corresponding subscriber identification information.

The subscriber distinguishing unit 534 performs a distinguishing process of a subscriber to be provided with a call transfer service, based on the call transfer service request information received through the call transfer request receiving unit 532. The subscriber distinguishing unit 534 searches the subscriber database 510 based on the subscriber identification information contained in the call transfer service request information, and distinguishes a subscriber who subscribed for a call transfer service by the results. And, the subscriber distinguishing unit 534 searches the subscriber database 510 based on the subscriber certification information contained in the call transfer service request information and certifies the corresponding identified subscriber.

The information checking unit 536 is configured to check information about the telematics device 100 and the mobile terminal 200 of the subscriber distinguished in the subscriber distinguishing unit 534. The information checking unit 536 searches a service registration information of the subscriber database 510 for checking the information about the telematics device 100 and the mobile terminal 200 of the distinguished subscriber. The information checking unit 536 checks the information about the telematics device 100 and the mobile terminal 200 of the corresponding subscriber in the telephone number field and the service information field of the service registration information.

The transfer processing unit 538 is configured to perform call transfer processing between the mobile terminal 200 and the telematics device 100 of the corresponding subscriber checked in the information checking unit 536. The transfer processing unit 538 requests the mobile communication network 300 to transfer to the telematics device 100 a service connection set between the mobile terminal 200 of the corresponding subscriber and the mobile communication network 300. Accordingly, the transfer processing unit 538 allows the mobile communication network 300 to transfer a service call of corresponding mobile terminal 200 to the corresponding telematics device 100.

The address book link module 540 searches and extracts an address book data corresponding to the mobile terminal 200 from the address book database 520 according to the mobile terminal 200 checked in the call transfer service module 530, and transmits the address book data to the telematics device 100. The address book link module 540 includes an address book data transmitting unit 542, an updating unit 544 and a link control unit 546.

The updating unit 544 periodically receives an address book data or a telephone number data stored in the mobile terminal 200 of the subscriber, updates the address book database 520 and stores the address book data or telephone number data into the address book database 520. The receiving of the address book may be made periodically or every time when an address book or a telephone directory of the mobile terminal is updated. The address book data stored in the mobile terminal 200 is updated in the address book database 520 and synchronized with the address book database 520.

The link control unit 546 includes a same person checking unit 547 and a link request receiving unit 548. When a subscriber of the mobile terminal 200 is distinguished in the call transfer service module 530, the same person checking unit 547 judges whether the corresponding subscriber is the same person as a subscriber who used the telematics device 100 previously, and in the case of the same person, the same person checking unit 547 does not transmit an address book data, and in the case of different person, the same person checking unit 547 transmits an address book data.

When an address book data transmission request is received from the telematics device 100, the link request receiving unit 548 is configured to transmit the address book data. That is, when a user requests to transmit an address book data in the telematics device 100, the link request receiving unit 548 transmits an address book data of a corresponding subscriber based on the signal.

When the link control unit 546 determines to transmit an address book data of a corresponding subscriber, the address book data transmitting unit 542 is configured to search and extract the address book data of the corresponding subscriber from the address book database 520 and transmit the address book data to the telematics device 100.

Figure 3:
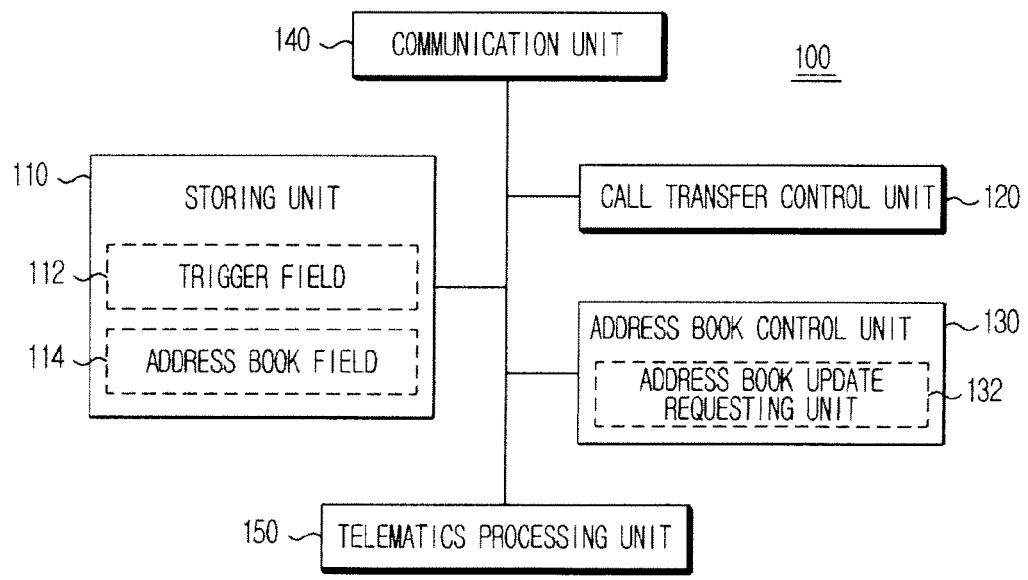
FIG. 3 is a view illustrating a configuration of a telematics device according to an embodiment of the present invention.

FIG. 3 is a view illustrating a configuration of a telematics device according to an embodiment of the present invention.

Referring to FIG. 3, the telematics device 100 according to the present invention includes a storing unit 110, a call transfer control unit 120, an address book control unit 130, a communication unit 140, and a telematics processing unit 150.

The storing unit 110 stores a setting information of a trigger that switches to the telematics device 100 a service connection set between the mobile terminal 200, for which a subscriber of the telemtics device 100 subscribed and the mobile communication network 300, and an address book data of a subscriber who used the telematics device 100 recently. The setting information of the trigger is stored in a trigger field 112 of the storing unit 110, and the address book data is stored in an address book field 114 of the storing unit 110. The setting information of the trigger stored in the trigger field 112 may include information for activating the trigger when activating a starting power of the vehicle, information for activating the trigger by a request operation of a user, and information for activating the trigger in the case that the mobile terminal 200 is in the vehicle.

The call transfer control unit 120 is configured to control a series of operations for implementing a call transfer service of the telematics device 100. That is, the call transfer control unit 120 executes the trigger according to the setting information stored in the trigger field 112 of the storing unit 110 to transmit to a call transfer service providing system interworking with the mobile communication network 300 a service request information of the mobile terminal 200 for requesting a switch of a service connection. The call transfer control unit 120 switches the service connection of the mobile terminal 100 according to response of the call transfer service providing system.

The address book control unit 130 is configured to provide the subscriber identification information and the subscriber certification information to the address book data link service providing system 500 according to execution of the trigger, and to update and store into the address book field 114 of the storing unit 110 an address book data of a corresponding subscriber provided after checking the subscriber. And, the address book control unit 130 includes an address book update requesting unit 132 for transmitting an address book update request information to the address book data link service providing system 500 by manipulation of the user of the telematics device 100 to receive a recent address book.

The communication unit 140 is connected with the mobile communication network 300. That is, the communication unit 140 is configured to perform operations related to call transfer request and address book data sending/receiving with the address book data link service providing system 500 interworking with the mobile communication network 300 through the mobile communication network 300, and to process data related to a service function provided by the mobile communication network 300.

The telematics processing unit 150 is configured to provide a user with a telematics service provided from the telematics service providing system 400 through the mobile communication network 300, and to perform a telematics function according to the telematics service.

Hereinafter, a method for providing an address book data link service between telematics and a mobile terminal according to an embodiment of the present invention is described with reference to FIG. 4.

Figure 4:
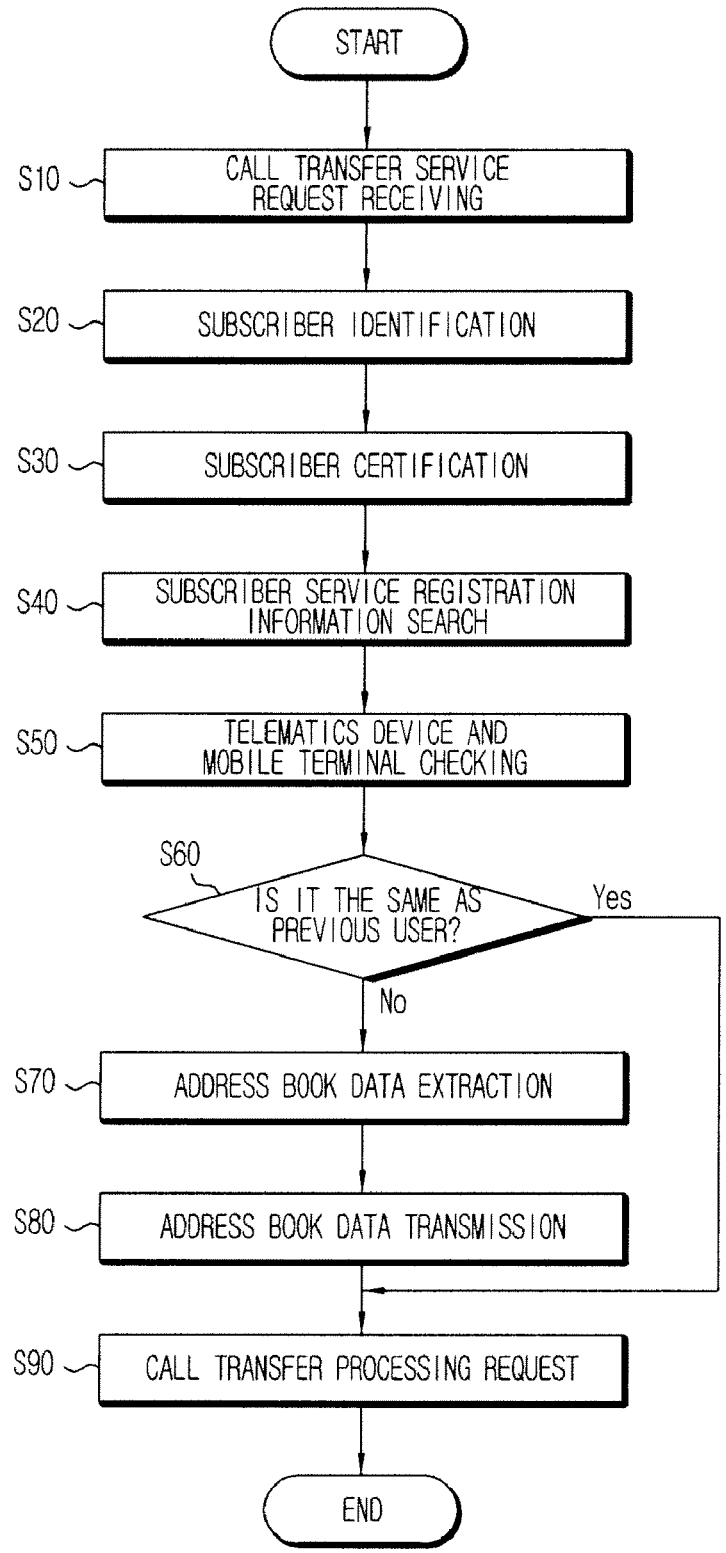
FIG. 4 is a flow chart illustrating a method for providing an address book data link service between telematics and a mobile terminal according to an embodiment of the present invention.

FIG. 4 is a flow chart illustrating a method for providing an address book data link service between telematics and a mobile terminal according to an embodiment of the present invention.

Referring to FIG. 4, first, an address book data link service providing system receives a call transfer service request information from a telematics device mounted in a vehicle. This is the case that a subscriber having a mobile terminal gets in a vehicle or attempts to transfer a call to the telematics device. (S10)

When the call transfer service request information is received, the corresponding information is analyzed, a subscriber database is searched, and a subscriber who requested the corresponding call transfer service is identified. (S20)

When the subscriber is identified, the corresponding subscriber is certified using a subscriber certification information stored in a subscriber database. For this purpose, the call transfer service request information contains the subscriber certification information, for example a password together with a subscriber identification information, i.e. ID to certify the corresponding subscriber. (S30)

When the subscriber is identified and certified, a service registration information of the corresponding subscriber is searched. The service registration information of the subscriber is stored in the subscriber database. (S40)

When the service registration information of the subscriber is searched, information about the telematics device and the mobile terminal of the subscriber is checked. (S50)

When the telematics device and the mobile terminal of the corresponding subscriber are checked, it is judged whether the corresponding subscriber is the same person as a subscriber who used the telematics device previously. This judging step is performed by comparing information of a subscriber who got in the vehicle recently and used telematics through call transfer using the telematics device, with information of the subscriber identified and certified through the steps S20 and 30. (S60)

In the case of different persons, an address book data corresponding to the mobile terminal of the subscriber stored in an address book database of an address book data link server is extracted. (S70)

When the address book data is extracted, the extracted address book data is transmitted to the telematics device of the corresponding subscriber who requested call transfer via a mobile communication network. (S80)

After the address book data is transmitted to the telematics device, a call transfer processing request is transmitted to the mobile communication network. The mobile communication network transfers to the telematics device a service connection call of the mobile terminal of the corresponding subscriber. (S90)

Through the above-mentioned process, the service connection call of the mobile terminal is transferred to the telematics device, and the address book data stored in the mobile terminal of the corresponding subscriber is provided to the telematics device. Accordingly, a user can use the address book data used in the mobile terminal at the telematics device.

Next, a process performed at each node of the address book data link service providing system between telematics and a mobile terminal according to an embodiment of the present invention is described in detail with reference to FIG. 5.

Figure 5:
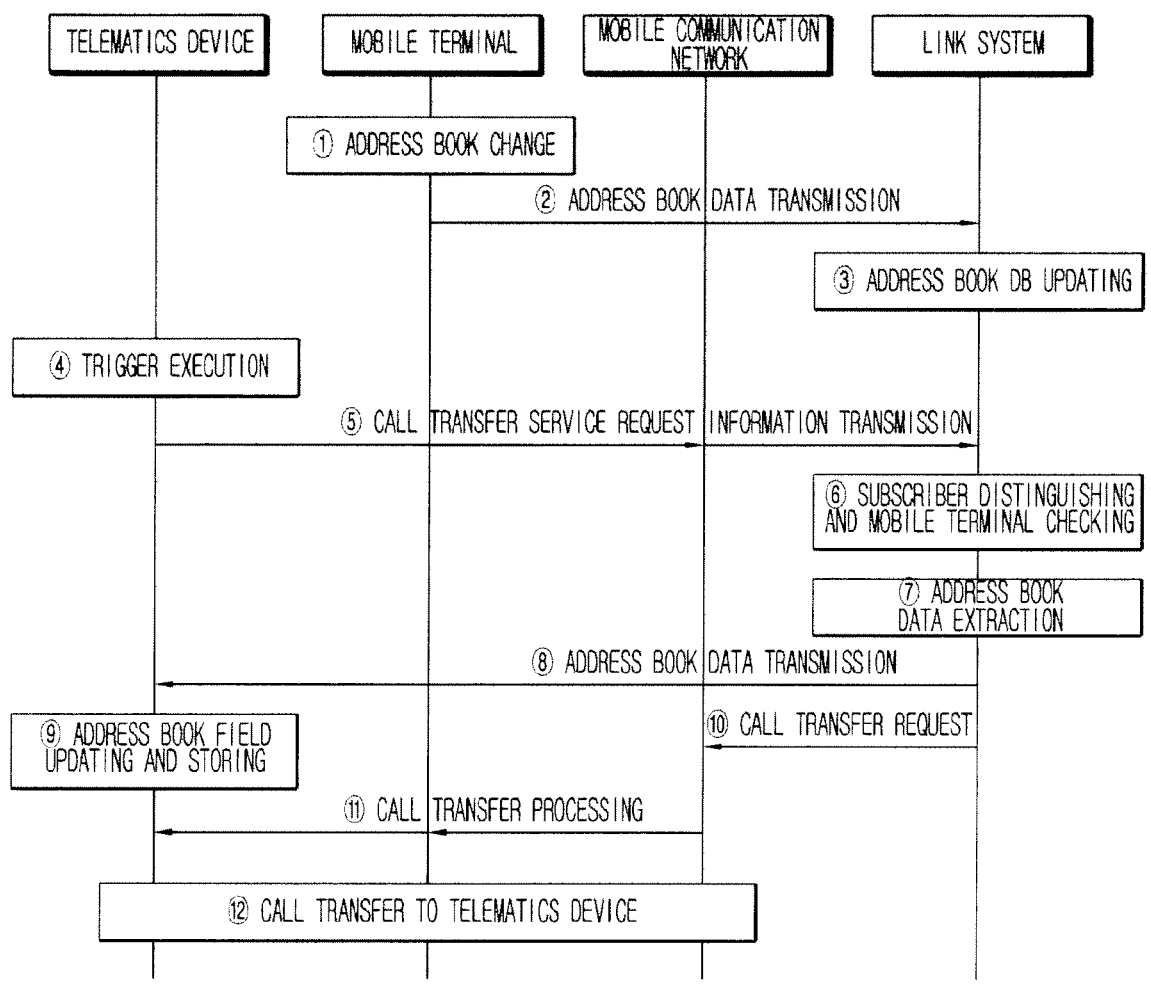
FIG. 5 is a view illustrating sequentially a process performed at each node of the address book data link service providing system between telematics and a mobile terminal according to an embodiment of the present invention.

FIG. 5 is a view illustrating sequentially a process performed at each node of the address book data link service providing system between telematics and a mobile terminal according to an embodiment of the present invention.

Referring to FIG. 5, first, a user manipulates a mobile terminal, for example arbitrarily changes an address book, or adds or deletes the address book. (1)

The address book data stored in the mobile terminal is transmitted to the system whenever the address book of the mobile terminal is changed or periodically in a predetermined cycle. This is for synchronizing an address book data of the mobile terminal with an address book data of an address book database of the system. (2)

When receiving the address book data, the system collects the address book data, and updates and stores the address book data into the address book database. The steps 1 to 3 are repeated, so that the address book data of the mobile terminal is synchronized with the address book data of the address book database of the system. (3)

Next, when a user wants to get in a vehicle or to use a telematics device, a trigger stored in a storing unit of the telematics device is executed. (4)

According to execution of the trigger, the telematics device transmits a call transfer service request information to the system via a mobile communication network. (5)

The system distinguishes a subscriber of the telematics device who transmitted the request information and checks a mobile terminal of the corresponding subscriber. (6)

When the mobile terminal of the corresponding subscriber is checked, the address book database is searched and an address book data corresponding to the mobile terminal of the corresponding subscriber is extracted. The extracted address book data is the same as an address book data stored in the mobile terminal. (7)

The extracted address book data is transmitted to the telematics device that requested a call transfer. (8)

The telematics device receives the address book data, and updates and stores the address book data into an address book field of the storing unit. (9)

The system transmits the address book data to the telematics device, and requests to the mobile communication network a call transfer for transferring a service call setting connected to the mobile terminal of the corresponding subscriber to the telematics device. (10)

The mobile communication network accepts a call transfer processing request of the corresponding subscriber according to the call transfer request, and transfers a call to the telematics device. (11)

The service call connected to the mobile terminal of the corresponding subscriber is stopped and set to the telematics device by call transfer processing of the mobile communication network. (12)

Hereinafter, a method for providing an address book data link service between telematics and a mobile terminal according to another embodiment of the present invention is described in detail with reference to FIG. 6.

Figure 6:
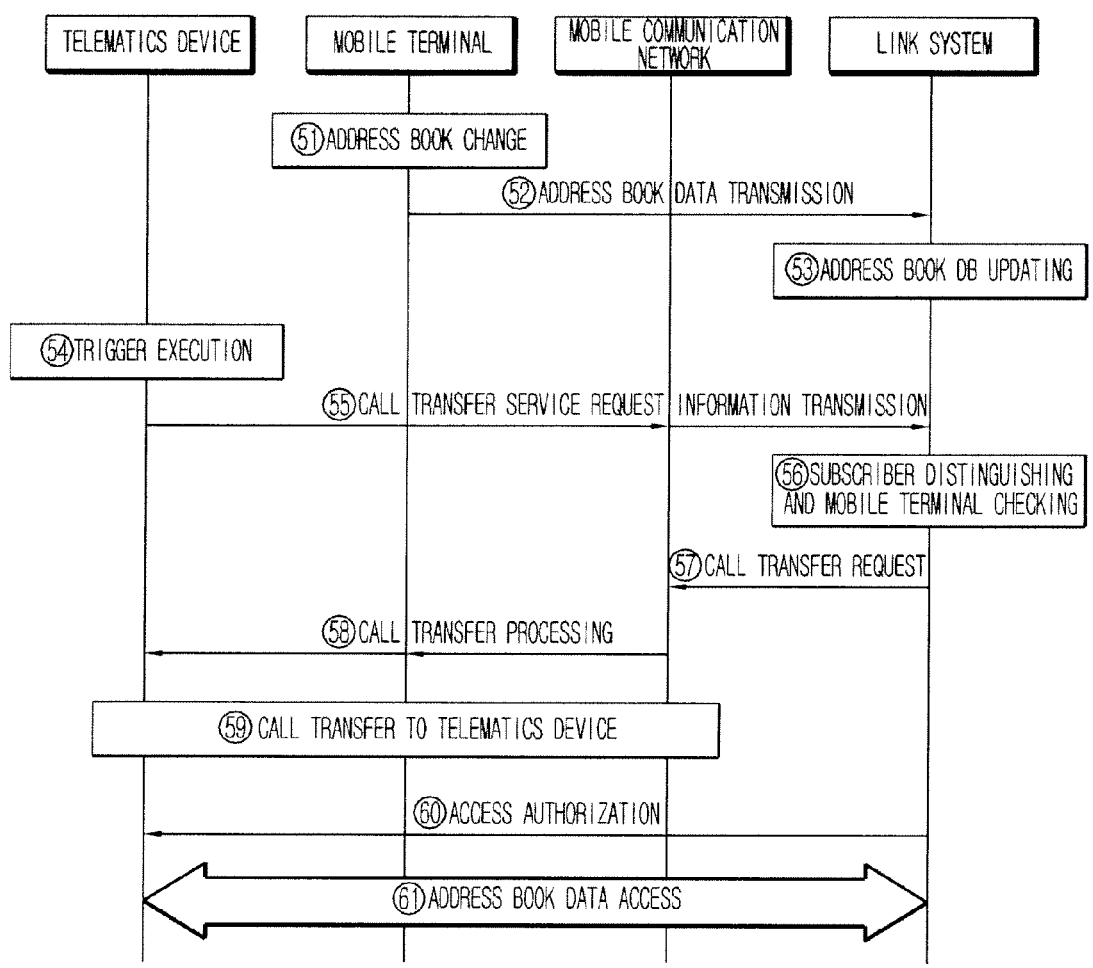
FIG. 6 is a view illustrating sequentially a method for providing an address book data link service between telematics and a mobile terminal according to another embodiment of the present invention.

FIG. 6 is a view illustrating sequentially a method for providing an address book data link service between telematics and a mobile terminal according to another embodiment of the present invention.

Referring to FIG. 6, steps S51 to S56 are the same as the above-mentioned steps 1 to 6 shown in FIG. 5, and the detailed description is omitted.

Subsequently, when the mobile terminal of the corresponding subscriber is checked in the step S51, the system requests to the mobile communication network a call transfer for transferring a service call setting connected to the mobile terminal of the corresponding subscriber to the telematics device. (57)

The mobile communication network accepts a call transfer processing request of the corresponding subscriber according to the call transfer request, and transfer a call to the telematics device. (58)

The service call connected to the mobile terminal of the corresponding subscriber is stopped and set to the telematics device by call transfer processing of the mobile communication network. (59)

When the call is transferred to the telematics device, the system authorizes the corresponding telematics device to access an address book link server. The address book link server stores address book data of mobile terminals and an address data stored in the mobile terminal of the corresponding subscriber. (60)

After being authorized with the access, in the case that the telematics device needs an address book data of the mobile terminal, the telematics device connects to the address book database of the system and accesses an address book data the corresponding terminal to obtain desired data. At this time, an address book data of the corresponding terminal is not downloaded in the telematics device, but necessary data is only accessed. (61)

As such, it should be understood that the detailed description and specific examples, while indicating preferred embodiments of the invention, are given by way of illustration only, since various changes and modifications within the spirit and scope of the invention will become apparent to those skilled in the art from this detailed description.

Industrial Applicability

According to the present invention, when a call is transferred by a call transfer service between a mobile terminal and telematics, a system automatically distinguishes a subscriber and provides a corresponding address book data to a telematics device, so that the address book data can be linked and used between the telematics device and the mobile terminal without a separate manipulation of a user.

The invention claimed is:

1. A method for providing a linkage service of address book data between a telematics device mounted in a vehicle and a mobile terminal of a subscriber, the mobile terminal in communication with a mobile communication network, the method comprising:
   receiving, by an address book link server, a call transfer service request from the telematics device and verifying the subscriber of the telematics device;
   searching, by the address book link server, a service registration information of the subscriber and checking information about the telematics device and the mobile terminal of the subscriber; and
   transmitting, by the address book link server the address book data of the mobile terminal of the subscriber to the telematics device
   wherein, if the subscriber of the telematics device is the same person as a subscriber who used the telematics device previously, the address book link server does not transmit the address book data of the mobile terminal of the subscriber to the telematics device.

2. The method according to claim 1, further comprising:
   requesting the mobile communication network to switch a service connection to the mobile communication network from the mobile terminal to the telematics device.

3. The method for providing a linkage service of address book data between telematics and a mobile terminal according to claim 1, wherein the step of receiving, by the address book link server, a call transfer service request from the telematics device comprises:
- receiving a call transfer service request including subscriber identification information and subscriber certification information from the telematics device; and
- identifying the subscriber of the telematics device based on the subscriber identification information and subscriber certification.

4. The method according to claim 1, further comprising:
periodically receiving, updating, and storing address book data stored in the mobile terminal of the subscriber to the address book link server.

5. The method according to claim 1, further comprising:
switching by the telematics device, a service connection with the mobile communication network from the mobile terminal to the telematics device, wherein the switching is performed based on setting information comprising (i) information for activating the trigger when activating a starting power of the vehicle, (ii) information for activating the trigger by a request operation of the user, and (iii) information for activating the trigger in the case that the mobile terminal is in the vehicle.

6. A system for providing a linkage service of address book data between a telematics device mounted in a vehicle and a mobile terminal of a subscriber, the mobile terminal in communication with a mobile communication network, the method comprising:
- a subscriber database configured to store service registration information including a subscriber information of the telematics device, and a terminal information about the telematics device and the mobile terminal of the subscriber;
- an address book database configured to collect, classify and store address book data stored in mobile terminals of a plurality of subscribers; and
- a call transfer service module configured to:
  - receive a call transfer service request from the telematics device;
  - determine, based on, the call transfer service request a subscriber of the telematics device;
  - check information about the telematics device and the mobile terminal of the subscriber;
  - request, the mobile communication network to switch a service connection with the mobile communication network from the checked mobile terminal to the telematics device; and
- an address book link module configured to (i) extract address book data of the mobile terminal checked in the call transfer service module from the address book database and transmit the address book data to the telematics device, and (ii) if the subscriber of the telematics device is the same person as a subscriber who used the telematics device previously, the address book link module is configured to prevent the transmission of the address book data of the mobile terminal of the subscriber to the telematics device.

7. The system according to claim 6,
wherein the address book link module further comprises an updating unit configured to periodically receive, update and store address book data stored in the mobile terminal of the subscriber into the address book database.

8. The system according to claim 6,
wherein the address book link module further comprises a link request receiving unit configured to for performing address book link processing after receiving the address book data transmission request from the telematics device.

9. The system according to claim 6, wherein the call transfer service module comprises:
- a call transfer request receiving unit configured to receive a call transfer service request information including subscriber identification information and subscriber certification information from the telematics device;
- a subscriber distinguishing unit configured to (i) identify the subscriber of the telematics device based on the subscriber identification information of the received call transfer service request and (ii) certify the subscriber based on the subscriber certification information.

10. The system according to claim 6 wherein the call transfer service module is configured to request the mobile communication network to switch a service connection with the mobile communication network from the checked mobile terminal to the telematics device based on setting information comprising (i) information for activating the trigger when activating a starting power of the vehicle, (ii) information for activating the trigger by a request operation of the user, and (iii) information for activating the trigger in the case that the mobile terminal is in the vehicle.

11. A telematics device capable of sending and receiving a predetermined data with a mobile communication network, the telematics device comprising:
- a storing unit having a (i) trigger field configured to store setting information of a trigger that switches a service connection with the mobile communication network from a mobile terminal, for which a subscriber of the telematics device subscribed, to the telematics device, and (ii) an address book field configured to store address book data of a subscriber who used the telematics device recently;
- a call transfer control unit configured to execute the trigger according to the setting information, wherein when the trigger is executed, the call transfer control unit is configured to (i) request, from a call transfer service providing system in communication with the mobile communication network, a switch of the service connection with the mobile terminal, and (ii) switch the service connection of the mobile terminal according to a response of the call transfer service providing system; and
- an address book control unit configured to (i) provide subscriber identification information and subscriber certification information according to the execution of the trigger, (ii) determine a subscriber based on the subscriber identification information and the subscriber certification information, and (iii) update and store address book data of a corresponding subscriber provided from an address book link server into the address book field of the storing unit,
wherein the setting information of the trigger comprises (i) information for activating the trigger when activating a starting power of the vehicle, (ii) information for activating the trigger by a request operation of the user, and (iii) information for activating the trigger in the case that the mobile terminal is in the vehicle.

12. The telematics device according to claim 11, wherein the address book control unit further comprises:
- an address book requesting unit configured to request the address book link server to update an address book to the telematics device.

13. The telematics device according to claim 11, wherein, if the subscriber of the telematics device is the same person as a subscriber who used the telematics device previously, the address control unit server does not transfer the address book data of the mobile terminal of the subscriber from the address book link server to the address book field of the storing unit.

14. A method for providing a linkage service of address book data between a telematics device in a vehicle and a mobile terminal, the mobile terminal in communication with a mobile communication network, the method comprising:

the system receiving a call transfer service request information from the telematics device and distinguishing a subscriber of the telematics device;

the system searching a service registration information of the subscriber and checking information about the telematics device and the mobile terminal of the subscriber;

the system requesting the mobile communication network to switch a service connection with the mobile communication network from the mobile terminal to the telematics device; and the system authorizing the call-transferred telematics device to access an address book link server and an address book data stored in the mobile terminal of the subscriber, wherein, if the subscriber of the telematics device is the same person as a subscriber who used the telematics device previously, the telematics device does not access the address book data of the mobile terminal of the subscriber stored on the address book link server.

15. The method according to claim 14, wherein the step of requesting the mobile communication network to switch a service connection with the mobile communication network from the mobile terminal to the telematics device is performed based on setting information comprising (i) information for activating the trigger when activating a starting power of the vehicle, (ii) information for activating the trigger by a request operation of the user, and (iii) information for activating the trigger in the case that the mobile terminal is in the vehicle.

* * * * *